United States Patent [19]

Kase et al.

[11] Patent Number: 4,789,705

[45] Date of Patent: Dec. 6, 1988

[54] RESIN COMPOSITION COMPRISING AN ISOCYANATE HAVING AN ISOCYANURATE RING IN A NONPOLAR PETROLEUM HYDROCARBON SOLVENT

[75] Inventors: Mitsuo Kase, Chiba; Noboru Okoshi, Sodegaura; Kazue Tsuyuzaki, Chiba, all of Japan

[73] Assignee: Dainippon Ink and Chemicals, Inc., Tokyo, Japan

[21] Appl. No.: 21,790

[22] Filed: Mar. 4, 1987

[30] Foreign Application Priority Data

Mar. 10, 1986 [JP] Japan .................................. 61-50525

[51] Int. Cl.$^4$ ...................... C08G 18/34; C08G 18/42; C08G 18/70; C08J 83/00
[52] U.S. Cl. ..................... 524/590; 524/602; 524/606; 528/80; 528/81; 528/85; 528/67
[58] Field of Search .................. 528/80, 81, 85, 67; 524/590, 602, 606

[56] References Cited

U.S. PATENT DOCUMENTS

| | | | |
|---|---|---|---|
| 3,737,432 | 6/1973 | George et al. | 528/85 |
| 4,080,345 | 3/1978 | Riemhofer | 528/85 |
| 4,125,545 | 11/1978 | Kroplinski et al. | 528/81 |
| 4,138,376 | 2/1979 | Nicks | 524/872 |
| 4,647,623 | 3/1987 | Kase et al. | 528/85 |

*Primary Examiner*—Harold D. Anderson
*Assistant Examiner*—Dennis R. Daley
*Attorney, Agent, or Firm*—Sherman and Shalloway

[57] ABSTRACT

A resin composition comprising (A) a polyisocyanate having an isocyanurate ring obtained by reacting at least one diisocyanate selected from alkylene diisocyanates, cycloalkylene diisocyanates and aralkylene diisocyanates with a diol having 10 to 40 carbon atoms or with a polyester polyol containing 12-hydroexystearic acid as an essential component in the presence of an isocyanuration catalyst, and (B) a nonpolar organic solvent. The composition is useful, for example, as a point, an adhesive or a molding material.

19 Claims, No Drawings

RESIN COMPOSITION COMPRISING AN ISOCYANATE HAVING AN ISOCYANURATE RING IN A NONPOLAR PETROLEUM HYDROCARBON SOLVENT

This invention relates to a resin composition comprising a polyisocyanate containing an isocyanurate ring which has excellent handlability and weatherability and little toxicity and is very useful in industrial fields as a paint, an adhesive, a molding material, etc.

Among curing agents for polyurethane resins having excellent mechanical properties such as high abrasion resistance and excellent chemical resistance, polyisocyanates derived from alkylene diisocyanates and cycloalkylene diisocyanates known as 'non-yellowing' diisocyanates and polyisocyanates derived from aralkylene diisocyanates known as "difficultly-yellowing" diisocyanates have good weatherability and durability. Above all, polyisocyanates having an isocyanurate ring are known to have higher weatherability and durability than conventional biuret-type or adduct-type polyisocyanates because of the high chemical stability of the isocyanurate ring.

Polyisocyanates of the isocyanurate type derived from alkylene diisocyanates, cycloalkylene diisocyanates, etc. have very good properties, and are expected to have wider industrial applications. However, since the isocyanurate ring in these isocyanurate-type polyisocyanates have high polarity, it is necessary to use them as a solution in ethyl acetate, etc. which is a toxic polar solvent having strong dissolving power or in toluene, xylene, etc. which are toxic nonpolar solvent having strong dissolving power. The use of such solvents causes great hazards in practical application in regard to working environments, atmospheric pollution, performance, etc.

It is an object of this invention to obviate the need to use a toxic solvents having high dissolving power which is essential in the case of using conventional polyisocyanates having an isocyanurate ring derived from the aforesaid alkylene diisocyanates, etc.

The above object is achieved in accordance with this invention by a composition comprising (A) a polyisocyanate having an isocyanurate ring obtained by reacting at least one diisocyanate compound selected from alkylene diisocyanates, cycloalkylene diisocyanates and aralkylene diisocyanates, particularly at least one polyisocyanate compound selected from the group consisting of alkylene diisocyanate compounds having an alkylene group with 2 to 8 carbon atoms, cycloalkylene diisocyanate compounds having a cycloalkylene group with 6 to 8 carbon atoms and aralkylene diisocyanate compounds having an aralkylene group with 7 or 8 carbon atoms, with a diol having 10 to 40 carbon atoms or with a polyester polyol containing 12-hydroxystearic acid as an essential component in the presence of an isocyanuration catalyst, and (B) a nonpolar organic solvent having an aniline point of 10° to 70° C.

Examples of the alkylene diisocyanate compounds used as one starting material for production of the polyisocyanate (A) are compounds having an alkylene group with 2 to 8 carbon atoms or mixtures threreof, such as 1,4-tetramethylene diisocyanate or 1,6-hexamethylene diisocyanate.

Typical examples of the cycloalkylene diisocyanate compounds are compounds having a cycloalkylene group with 6 to 8 carbon atoms or mixtures thereof, such as 1,3- or 1,4-diisocyanate cyclohexane and 1,3- or 1,4-bis(isocyanatomethyl)-cyclohexane.

Typical examples of the aralkylene diisocyanate compounds are compounds having an aralkylene group with 7 or 8 carbon atoms or mixtures thereof, such as 1,3- or 1,4-xylylene diisocyanate.

If alkylene-, cycloalkylene- and aralkylene-diisocyanate compounds having an alkylene, cycloalkylene or aralkylene group with 9 or more carbon atoms are used, isocyanurate ring-containing polyisocyanates derived from these compounds have a very much reduced content of isocyanate groups. This is undesirable in designing the resin, and moreover economically disadvantageous in practical applications. It is possible however to use these alkylene-, cycloalkylene- or aralkylenediisocyanates having 9 or more carbon atoms in the alkylene, cycloalkylene or aralkylene group together with the diisocyanates defined in the present invention. The proportion of such diisocyanates having 9 or more carbon atoms is desirably not more than 50%, preferably not more than 30%.

Examples of the diisocyanates having 9 or more carbon atoms in the alkylene, cycloalkylene or aralkylene group include 2,2,4- or 2,4,4-trimethylhexamethylene diisocyanate, isopropylidene-bis(4-cyclohexyl isocyanate), 3-isocyanatomethyl-3,5,5-trimethylcyclohexylisocyanate, etc.

The diol used as the other starting material for production of the polyisocyanate (A) is a diol having 10 to 40 carbon atoms, preferably 12 to 30 carbon atoms. If the number of carbon atoms of the diol is less than 10, the resulting polyisocyanate containing an isocyanurate ring is difficult to dissolve in the nonpolar organic solvent. On the other hand, the use of diols having more than 40 carbon atoms undesirably reduces the content of the isocyanate groups in the resulting polyisocyanates.

The diols having 10 to 40 carbon atoms used in the invention are usually diols having an alkylene or cycloalkylene chain which may contain a substituent such as a hydrocarbon group. Typical examples of the diols used in the invention are 1,10-decanediol, 1,12-dodecanediol, 2-hydroxypalmityl alcohol, 12-hydroxystearyl alcohol, a hydrogenated product of a dimer of oleyl alcohol, and 2,2-bis(4-hydroxycyclohexyl)propane (common name "hydrogenated bisphenol A").

As a matter of course, the use of a certain monohydric alcohol, such as a long-chain alcohol having an equivalent chain length in place of the long-chain diols having 10 to 40 carbon atoms reduces the functionality of the resulting polyisocyanate having an isocyanurate ring, and undesirably impairs the properties of the polyurethane resin.

The use of trihydric or higher alcohols having a high functionality is neither desirable because it excessively increases the functionality of the polyisocyanate and tends to cause viscosity increase and gellation.

The use of a small amount of a monoalcohol or triol together with the diol defined in this invention is permissible so long as it does not markedly impair the properties of the polyisocyanate used in the invention.

In the production of the polyisocyanate containing an isocyanurate ring, the suitable amount of the diols is 1 to 40%, preferably 2 to 30%, based on the amount of the diisocyanate charged.

The polyester polyol containing 12-hydroxystearic acid as an essential component is typically a polyester polyol derived usually by esterification reaction from 12-hydroxystearic acid and a difunctional or trifunctional hydrocarbon polyol having 2 to 40 carbon atoms. Examples of the difunctional or trifunctional hydrocarbon polyols having 2 to 40 carbon atoms include ethylene glycol, propylene glycol, 1,3-propanediol, 1,4-butanediol, 1,3-butanediol, 1,5-pentanediol, 1,6-hexanediol, 1,8-octanediol, 1,10-decanediol, 1,12-dodecanediol, 12-hydroxystearyl alcohol, hydrogenated dimerized oleyl alcohol, neopentyl glycol, 2,2,4-trimethyl-1,3-methanediol, cyclohexanedimethanol, hydrogenated bisphenol A, glycerin and trimethylolpropane.

Hydrogenated castor oil is also within the scope of the polyester polyol. If especially desired, it is possible of course to use a polyester polyol obtained by using adipic acid, hexahydrophthalic anhydride or epsiloncaprolactone in addition to the 12-hydroxystearic acid and the difunctional or trifunctional hydrocarbon polyol having 2 to 40 carbon atoms mentioned above. A monoester polyol derived from 12-hydroxystearic acid and the aforesaid diol or triol may permissibly be used as is the case with the polyester polyol so long as the resulting polyester (A) can have affinity for the nonpolar organic solvent (B).

The 12-hydroxystearic acid used in this invention is usually obtained by hydrogenating and hydrolyzing castor oil, and has a purity of about 90% and contains about 10% of palmitic acid, stearic acid, etc. as impurities.

The suitable number average molecular weight of the polyester polyol is usually within the range of 400 to 2,000, preferably 600 to 1,500. The suitable number of the functional groups of the polyester polyol is 1.5 to 3.0, preferably 1.7 to 2.5.

The amount of the polyester polyol containing 12-hydroxystearic acid as an essential component used in the production of the polyisocyanate containing an isocyanurate ring is 1 to 40%, preferably 2 to 35%, based on the amount of the diisocyanate charged.

The isocyanurating catalyst that can be used in this invention is a compound having a low electron density and containing strongly cationic atoms (atomic groupings). Examples include N,N,N-trimethyl-N-2-hydroxypropyl ammonium p-tertiary butylbenzoate represented by the following formula

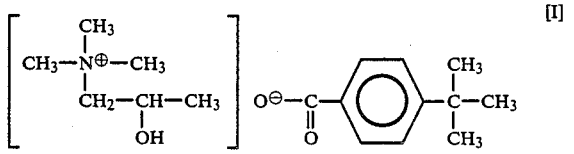

sodium ethylate and sodium propionate. The N,N,N-trimethyl-N-2-hydroxypropyl ammonium p-tertiary butylbenzoate is a particularly suitable catalyst for preparation of the polyisocyanate (A) because it is easy to purify.

Usually, the suitable amount of the isocyanurating catalyst is in the range of 10 to 1000 ppm, preferably 20 to 500 ppm, as a diluted solution in an organic solvent.

The isocyanurating reaction for obtaining the polyisocyanate (A) is usually carried out at a temperature of 30° to 120° C., preferably 40° to 100° C., at a conversion in the range of 20 to 70% by weight, preferably 30 to 65% by weight, based on the total amount of the diisocyanate compound and the diol charged. When the conversion exceeds 70% by weight, the resulting polyisocyanate undesirably has an excessively high molecular weight and decreases in solubility.

The final polyisocyanate (A) is obtained, for example, by treating the reaction mixture after the reaction with such a compound as phosphoric acid, monochloroacetic acid or dodecylbenzenesulfonic acid to deactivate the catalyst contained in it and then subjecting the residue to molecular distillation to remove the unreacted diisocyanate compound.

The nonpolar organic solvent (B) used in this invention is a nonpolar organic solvent having low toxicity and weak dissolving power which has an aniline point of 10° to 70° C., preferably 12° to 65° C., and includes an aliphatic and/or naphthenic hydrocarbon organic solvent.

Typical examples of such non-polar organic solvent are petroleum hydrocarbon organic solvents such as "Haws" (made by Shell Chemical Co.; aniline point 15° C.), "Swasol 310" (made by Maruzen Oil Co.; aniline point 16° C.), "Esso Naphtha No. 6" (made by Exxon Chemical Co.; aniline point 43° C.), "Laws" (made by Shell Chemical Co.; aniline point 44° C.), "Esso Naphtha No. 5" (made by Exxon Chemical; aniline point 55° C.) and "Pegasol 3040" (made by Mobil Oil Co.; aniline point 55° C.); methylcyclohexane (aniline point 40° C.); and ethylcyclohexane (aniline point 44° C.

The resin composition of this invention is prepared by mixing the polyisocyanate (A) containing an isocyanurate ring obtained by the method described hereinabove with the nonpolar organic solvent (B). For example, a resin composition obtained by mixing the polyisocyanate with the nonpolar organic solvent in a mixing ratio of 10-90:90-10 may be used directly as a curing agent for polyurethane resins.

The present invention includes within its scope not only the resin composition composed of the polyisocyanate and nonpolar organic solvents as constituents, but also a resin composition comprising the polyisocyanate (A) and the nonpolar organic solvent (B) as constituents and also a polyol (solution) as a main component of a polyurethane resin, a filler and other additives.

The polyol as a main component of the polyurethane resin is a polyol having at least two hydroxyl groups per molecule, and includes, for example, alkyd polyols, acrylic polyols, acrylic alkyd polyols, polyester polyols and polybutadiene oligomers. The polyol should have solubility in, or some degree of affinity or dispersibility for or in, the nonpolar organic solvent.

Examples of the polyol suitable for dissolving in the nonpolar organic solvent include alkyd polyols having an oil length of at least 40%, alkyd polyols derived from materials having high affinity for the nonpolar organic solvent (e.g., p-tertiary butylbenzoic acid), and acrylic polyols (preferably acrylic polyols containing at least 10% of an alkyd component) derived from materials having high affinity for the nonpolar organic solvent (e.g., isobutyl methacrylate and 2-ethylhexyl methacrylate).

In use, the resin composition of this invention ensures a much improved working environment over the case of using a conventional composition containing a strongly toxic polar organic solvent, and reduces environmental pollution. The performance of the resin composition itself is also much improved over the conventional resin composition. For example, when a coating composition prepared by using the resin composition of this invention is used in overcoating a material which has already been coated with a coating susceptible to attack by a polar solvent or in repairing that coating, lifting (wrinkling) seen in the case of applying a paint cotaining a polar solvent does not occur, and a smooth coated film having a high commercial value is obtained.

The present invention naturally includes within its scope the use of a composition comprising the polyisocyanate (A) and the nonpolar organic solvent (B). It should be understood however that it also includes the case of using a composition comprising the above composition and a polar organic solvent.

As a special case, the present invention also includes a resin composition which is formed when a solution of the polyisocyanate (A) in a polar solvent and a solution of the polyol in a nonpolar solvent are separately prepared and just prior to use, mixed with each other. In order not to impair the effects of this invention as much as possible, it is necessary to limit the amount of the polar organic solvent contained in the resin composition of this invention to not more than 35%, preferably not more than 20% by weight, based on the total amount of the organic solvents used.

The above polar organic solvents, in accordance with the usual terminology, include ester-type solvents such as ethyl acetate and butyl acetate, ketone-type solvents such as methyl ethyl ketone and methyl isobutyl ketone; ether-type solvents such as butyl Cellosolve acetate.

The following examples illustrate the present invention more specifically.

EXAMPLE 1

A 5-liter four-necked glass flask equipped with a stirrer, a nitrogen gas introducing tube, an air cooling tube and a thermometer was charged with 3,500 g of "Desmodur H" (hexamethylene diisocyanate produced by Bayer AG) and 716.3 g of "Loxalol" (12-hydroxystearyl alcohol producd by Henkel AG; purity about 80%).

The flask was then fitted with an oil bath, and with stirring, the temperature was raised to 65° C. The contents of the flask became a clear solution. Subsequently, it was maintained at the same temperature for 2 hours and then the temperature was lowered to 55° C.

As an isocyanuration catalyst, 3.4 g of a 20% butyl Cellosolve solution of N,N,N-trimethyl-N-2-hydroxypropyl ammonium p-tertiary butylbenzoate (formula [I] given hereinabove) was added in portions. The mixture was subsequently reacted at 60° C. for 3 hours. Then, 3.4 g of a 7% xylene solution of monochloroacetic acid was added to deactivate the isocyanuration catalyst and thus to terminate the isocyanuration reaction.

The reaction mixture was cooled to room temperature, and a 1000 g aliquot of it was subjected to molecular distillation to give 549.4 g (conversion 55.0%) of a polyisocyanate containing an isocyanurate ring as a distillation residue and 450.0 g (recovery ratio 45.0%) of hexamethylene diisocyanate as a distillate.

The resulting polyisocyanate containing an isocyanurate ring was diluted with "Haws" (nonpolar solvent) to a concentration of 75% to give 732.2 g of a clear polyisocyanate solution (the desired resin composition of the invention).

The resulting polyisocyanate solution had a non-volatile content of 75.1%, a Gardner color number of less than 1, a Gardner viscosity of E-F, an isocyanate content of 11.2% and a molecular weight of 953. The ratio of its dilution with the diluting solvent "Haws" was more than 1,000%.

A resin varnish was prepared by mixing the polyisocyanate solution with "Beckosol J-557" [a safflower oil-modified medium-oil alkyd resin produced by Dainippon Ink and Chemicals, Inc.; the standard properties described in the catalog are as follows: non-volatile content=50±1%, solvent="Swasol 310", phthalic acid content=30%, oil=safflower oil, oil length=51%, Gardner viscosity (25° C.)=V-X, Gardner color number=less than 7, acid value=less than 8, hydroxyl value actually measured=60] so that the NCO/OH equivalent ratio became 1. When the resulting varnish was coated on a transparent glass plate, a good cured film was obtained.

Separately, a resin varnish was prepared by mixing the polyisocyanate solution with an acrylic polyol containing tertiary butyl methacrylate as a main component and having a non-volatile content of 50.5%, a Gardner color number of less than 1, a Gardner viscosity of $Z_3$, an acid value of 3.5 and a hydroxyl value of 30 so that the NCO/OH equivalent ratio became 1.0. When the resulting varnish was coated on a glass plate, a good cured film was obtained.

COMPARATIVE EXAMPLE 1

The same reactor as used in Example 1 was charged with 3,500 g of hexamethylene diisocyanate, and with stirring, the temperature was raised to 55° C. The isocyanuration reaction was carried out as in Example 1 using 4.4 g of the same catalyst solution as used in Example 1. There was obtained 3,492 g of the reaction mixture containing the deactivated catalyst.

A 1,000 g aliquot of the reaction mixture was subjected to molecular distillation to give 359.6 g (conversion 36.0%) of a polyisocyanate containing an isocyanurate ring as a distillation residue and 639.4 g (64.0%) of hexamethylene diisocyanate as a distillate.

An attempt was made to dilute the resulting polyisocyanate to 75% with "Haws" (the nonpolar diluting solvent used in Example 1). But the polyisocyanate had no solubility in this solvent, and a diluted solution of it could not be prepared.

COMPARATIVE EXAMPLE 2

Hexamethylene diisocyanate (3,500 g), 225 g of 1,3-butanediol and 1.7 g of the same catalyst solution as used in Example1 were treated in the same way as in Example 1 to give 3,713 g of the reaction mixture containing the deactivated catalyst.

A 1,000 g aliquot of the reaction mixture was subjected to molecular distillation to give 541.5 g (conversion 54.2%) of a polyisocyanate containing an isocyanurate ring as a distillation residue and 457.5 g (recovery ratio 45.8%) of hexamethylene diisocyanate as a distillate.

The resulting polyisocyanate had no solubility in the nonpolar solvent "Haws" and a diluted solution of the polyisocyanate could not be prepared by using "Haws".

EXAMPLE 2

The same isocyanuration reaction as in Example 1 was carried out except that 3,290 g of hexamethylene diisocyanate and 210 g of "Takenate 500" (xylylene diisocyanate produced by Takeda Chemical Industry Co., Ltd.) were used instead of 3,500 g of hexamethylene diisocyanate, and the amount of the isocyanuration catalyst used in Example 1 was changed to 4.7 g. There was obtained 4,219 g of the reaction mixture containing the deactivated catalyst.

A 1,003 g aliquot of the reaction mixture was subjected to molecular distillation to give 522 g (conversion 52.1%) of a polyisocyanate containing an isocyanurate ring as a distillation residue and 480 g (recovery ratio 47.9%) of a distillate. Analysis showed the distillate to be substantially pure hexamethylene diisocyanate.

The resulting polyisocyanate was diluted to a concentration of 75% with "Haws" (a petroleum hydrocarbon organic solvent) to give 696 g of a clear polyisocyanate solution (the desired resin composition of this invention).

The polyisocyanate solution had a non-volatile content of 75.0%, a Gardner color number of less than 1, a Gardner viscosity of G-H, an isocyanate content of 10.3% and a molecular weight of 1,010. The ratio of dilution of the polyisocyanate with "Haws" was more than 1,000%.

A resin varnish was prepared by mixing the polyisocyanate solution with "Beckosol J-557" (safflower oil-modified medium oil alkyd resin) so that the NCO/OH equivalent ratio became 1.0. When the varnish was coated on a glass plate, a good cured film was obtained.

EXAMPLE 3

The same isocyanuration reaction as in Example 2 was carried out except that isophorone diisocyanate was used instead of xylylene diisocyanate (Takenate 500). There was obtained 4,218 g of the reaction mixture containing the deactivated catalyst.

A 1,000 g aliquot of the reaction mixture was subjected to molecular distillation to give 532.5 (conversion 53.3%) of a polyisocyanate containing an isocyanurate ring as a distillation residue and 466.5 g (recovery ratio 46.7%) of a distillate. Analysis showed the distillate to be a mixture of hexamethylene diisocyanate and isophorone diisocyanate.

The resulting polyisocyanate was diluted to a concentration of 75% with "Haws" (a petroleum hydrocarbon organic solvent) to give 707 g of a clear polyisocyanate solution (the desired resin composition of this invention).

The polyisocyanate solution had a non-volatile content of 75.1%, a Gardner color number of less than 1, a Gardner viscosity of F-G, an isocyanate content of 11.0% and a molecular weight of 949. The ratio of dilution of the polyisocyanate with "Haws" was more than 1,000%.

A resin varnish was prepared by mixing the polyisocyanate solution with "Beckosol J-557" so that the NCO/OH equivalent ratio became 1.0. When the varnish was coated on a glass plate, a good cured film was obtained.

EXAMPLE 4

The same isocyanuration reaction as in Example 1 was carried out except that 2,100 g of hexamethylene diisocyanate and 1,400 g of 1,3-bis(isocyanatomethyl)-cyclohexane (Takenate 600) were used instead of 3,500 g of hexamethylene diisocyanate, and the amount of the isocyanuration catalyst solution was changed to 3.9 g. There was obtained 4,215 g of the reaction mixture containing the deactivated catalyst.

A 1,001 g aliquot of the reaction mixture was subjected to molecular distillation to give 541.7 (conversion 54.2%) of a polyisocyanate containing an isocyanurate ring as a distillation residue and 457.8 g (recovery ratio 45.8%) of a distillate.

The resulting polyisocyanate was diluted to a concentration of 75% with "Laws" (a nonpolar petroleum hydrocarbon organic solvent; aniline point 44° C.) to give 722.3 g of a clear polyisocyanate solution (the desired resin composition of this invention).

The polyisocyanate solution had a non-volatile content of 75.1%, a Gardner color number of less than 1, a Gardner viscosity of F-G, an isocyanate content of 10.7% and a molecular weight of 929. The ratio of dilution of the polyisocyanate with "Laws" was more than 1,000%.

A resin varnish was prepared by mixing the polyisocyanate solution with "Beckosol J-557" so that the NCO/OH equivalent ratio became 1.0. When the varnish was coated on a glass plate, a good cured film was obtained.

A resin varnish was prepared by mixing the polyisocyanate solution with an acrylic alkyd polyol comprising tertiary butyl methacrylate as a main component and having an addition reaction ratio of acrylic monomers of 70%, a non-volatile content of 50.1%, a Gardner color number of 1, a Gardner viscosity of $Z_1$, an acid value of 3.8 and a hydroxyl value of 45 so that the NCO/OH ratio became 1.0. When the varnish was coated on a glass plate, a good cured film was obtained. When this resin varnish was coated on a coated film of an alkyd resin paint, no lifting phenomenon occurred and a coated film having a smooth and good appearance was obtained.

COMPARATIVE EXAMPLE 3

The same isocyanuration reaction as in Example 4 was carried out except that 12-hydroxystearyl alcohol was not used. A 1,000 g aliquot of the resulting reaction mixture containing the deactivated catalyst was subjected to molecular distillation to obtain 435.6 g (conversion 43.6%) of a polyisocyanate containing an isocyanurate ring.

The resulting polyisocyanate showed no solubility in the "Laws" (nonpolar solvent) or in "Haws" (the diluting solvent used in Example 1).

EXAMPLE 5

3,500 g of 1,3-bis(isocyanatomethyl)-cyclohexane, 245 g of 12-hydroxystearyl alcohol and 6.6 g of the same catalyst solution as used in Example 1 were treated in the same way as in Example 1 except that the isocyanuration reaction was carried out at 70° C. There was obtained 3,750 g of the reaction mixture containing the deactivated catalyst.

A 1,001 g aliquot of the resulting reaction mixture was subjected to molecular distillation to give 491.7 g (conversion 49.2%) of a polyisocyanate having an isocyanurate ring as a distillation residue and 506.7 g (recovery ratio 50.8%) of 1,3-bis(isocyanatomethyl)-cyclohexane as a distillate.

The resulting polyisocyanate was diluted to a concentration of 75% with "Haws" (nonpolar solvent) to give 656 g of a clear polyisocyanate solution (the desired resin composition of the invention).

The polyisocyanate solution had a non-volatile content of 75.0%, a Gardner viscosity of T-U, an isocyanate content of 12.8% and a molecular weight of 727. The ratio of dilution of the polyisocyanate with "Haws" was more than 1,000%.

A resin varnish was prepared by mixing the polyisocyanate solution with "Beckosol J-557" so that the NCO/OH equivalent ratio became 1.0. When the varnish was coated on a glass plate, a good cured film was obtained.

COMPARATIVE EXAMPLE 4

The same isocyanuration reaction as in Example 5 was carried out except that 12-hydroxystearyl alcohol was not used. A 1,000 g aliquot of the resulting reaction mixture containing the deactivated catalyst was subjected to molecular distillation to obtain 454.5 g (conversion 45.5%) of a polyisocyanate containing an isocyanurate ring.

The resulting polyisocyanate showed no solubility in "Haws" (nonpolar solvent), and therefore a diluted solution of the polyisocyanate in this solution could not be prepared.

EXAMPLE 6

The same isocyanuration reaction as in Example 5 was carried out except that the amount of 12-hydroxystearyl alcohol was changed to 294 g. There was obtained 3,785 g of the reaction mixture containing the deactivated catalyst.

A 1,000 g aliquot of the resulting reaction mixture was subjected to molecular distillation to give 439.8 g (conversion 44.0%) of a polyisocyanate having an isocyanurate ring as a distillation residue and 559.2 g (recovery ratio 56.0%) of 1,3-bis(isocyanatomethyl)-cyclohexane as a distillate.

The resulting polyisocyanate was diluted to a concentration of 75% with "Laws" (nonpolar solvent; aniline point 44° C.) to give 586.4 of a clear polyisocyanate solution (the desired resin composition of the invention).

The polyisocyanate solution had a non-volatile content of 74.9%, a Gardner viscosity of V-W, an isocyanate content of 12.5% and a molecular weight of 722. The ratio of dilution of the polyisocyanate with "Haws", separately determined, was more than 1,000%.

A resin varnish was prepared by mixing the polyisocyanate solution with "Beckosol J-557" so that the NCO/OH equivalent ratio became 1.0. When the varnish was coated on a glass plate, a good cured film was obtained.

EXAMPLE 7

A 75% "Haws" solution of a polyisocyanate having an isocyanurate ring (conversion 37.2%) was obtained by operating in the same way as in Example 1 except that 2-hydroxypalmityl alcohol was used instead of 12-hydroxystearyl alcohol.

The polyisocyanate solution had a non-volatile content of 74.9%, a Gardner color number of less than 1, a Gardner viscosity of F, an isocyanate content of 10.8% and a molecular weight of 948. The ratio of dilution of the polyisocyanate with "Haws" was more than 1,000%.

A resin varnish was prepared by mixing the polyisocyanate solution with "Beckosol J-557" so that the NCO/OH equivalent ratio became 1.0. When the varnish was coated on a glass plate, a good cured film was obtained.

EXAMPLE 8

A 5-liter four-necked glass flask equipped with a stirrer, a nitrogen gas introducing tube, an air cooling tube and a thermometer was charged with 3,500 g of "Desmodur H" and 400 g of hydrogenated castor oil (a glycerin ester of 12-hydroxystearic acid; hydroxyl value 160).

The flask was then fitted with an oil bath, and with stirring, the temperature was raised to 65° C. The contents of the flask became a uniform liquid. Subsequently, it was maintained at the same temperature for 2 hours and then the temperature was lowered to 55° C.

As an isocyanuration catalyst, 6.5 g of a 20% butyl Cellosolve solution of N,N,N-trimethyl-N-2-hydroxypropyl ammonium p-tertiary butylbenzoate (formula [I] given hereinabove) was added in portions. The mixture was subsequently reacted at 60° C. for 3 hours. Then, 6.5 g of a 7% xylene solution of monochloroacetic acid was added to deactivate the isocyanuration catalyst and thus to terminate the isocyanuration reaction.

The reaction mixture was cooled to room temperature, and a 1000 g aliquot of it was subjected to molecular distillation to give 381.7 g (conversion 38.2%) of a polyisocyanate containing an isocyanurate ring as a distillation residue and 617.5 g (recovery ratio 61.8%) of hexamethylene diisocyanate as a distillate.

The resulting polyisocyanate containing an isocyanurate ring was diluted with "Haws" (nonpolar solvent; aniline point 15° C.) to a concentration of 75% to give 510.3 g of a clear polyisocyanate solution (the desired resin composition of the invention).

The resulting polyisocyanate solution had a non-volatile content of 74.8%, a Gardner color number of less than 1, a Gardner viscosity of F-G, an isocyanate content of 12.3% and a molecular weight of 884. The ratio of its dilution with diluting solvent "Haws" was more than 1,000%.

A resin varnish was prepared by mixing the polyisocyanate solution with "Beckosol J-557" so that the NCO/OH equivalent ratio became 1. When the resulting varnish was coated on a transparent glass plate, a good cured film was obtained.

Separately, a resin varnish was prepared by mixing the polyisocyanate solution with an acrylic polyol (solvent "Haws") containing tertiary butyl methacrylate as a main component and having a non-volatile content of 50.5%, a Gardner color number of less than 1, a Gardner viscosity of $Z_3$, an acid value of 3.5 and a hydroxyl value of 30 so that the NCO/OH equivalent ratio became 1.0. When the resulting varnish was coated on a glass plate, a good cured film was obtained.

EXAMPLE 9

The same isocyanuration reaction as in Example 8 was carried out except that 3,290 g of hexamethylene diisocyanate and 210 g of xylylene diisocyanate ("Takenate 500") were used instead of 3,500 g of hexamethylene diisocyanate and the amount of the isocyanuration catalyst solution was changed to 8.1 g. There was obtained 3,910 g of the reaction mixture containing the deactivated catalyst.

A 1,002 g aliquot of the reaction mixture was subjected to molecular distillation to give 352.2 g (conversion 35.4%) of a polyisocyanate containing an isocyanurate ring as a distillation residue and 642.8 g (recovery ratio 64.6%) of a distillate. Analysis showed the distillate to be substantially pure hexamethylene diisocyanate.

The resulting polyisocyanate was diluted to a concentration of 75% with "Haws" (nonpolar petroleum hydrocarbon organic solvent) to obtain 470.2 g of a clear polyisocyanate solution (the desired resin composition of the invention).

The polyisocyanate solution had a non-volatile content of 74.9%, a Gardner color number of less than 1, a Gardner viscosity of H-I and an isocyanate content of 11.3%.

A resin varnish was prepared by mixing the polyisocyanate solution with "Beckosol J-557" so that the NCO/OH equivalent ratio became 1.0. When the varnish was coated on a glass plate, a good cured film was obtained.

EXAMPLE 10

The same isocyanuration reaction as in Example 9 was carried out except that isophorone diisocyanate was used instead of xylylene diisocyanate. There was obtained 3,908 g of the reaction mixture containing the deactivated catalyst.

A 1,000 g aliquot of the reaction mixture was subjected to molecular distillation to give 390.0 g (conversion 39.2%) of a polyisocyanate containing an isocyanurate ring as a distillation residue and 605.0 g (recovery ratio 60.8%) of a distillate. Analysis showed the distillate to be a mixture of hexamethylene diisocyanate and isophorone diisocyanate.

The resulting polyisocyanate was diluted to a concentration of 75% with "Haws" (a nonpolar petroleum hydrocarbon organic solvent) to give 518.6 of a clear polyisocyanate solution (the desired resin composition of this invention).

The polyisocyanate solution had a non-volatile content of 75.2%, a Gardner color number of less than 1, a Gardner viscosity of F-G, an isocyanate content of 12.1% and a molecular weight of 900. The ratio of dilution of the polyisocyanate with "Haws" was more than 1,000%.

A resin varnish was prepared by mixing the polyisocyanate solution with "Beckosol J-557" so that the NCO/OH equivalent ratio became 1.0. When the varnish was coate on a glass plate, a good cured film was obtained.

EXAMPLE 11

The same isocynuration reaction as in Example 8 was carried out except that 2,100 g of hexamethylene diisocyanate and 1,400 g of 1,3-bis(isocyanatomethyl)-cyclohexane (Takenate 600) were used instead of 3,500 g of hexamethylene diisocyanate, and the amount of the isocyanuration catalyst solution was changed to 8.3 g. There was obtained 3,909 g of the reaction mixture containing the deactivated catalyst.

A 1,000 g aliquot of the reaction mixture was subjected to molecular distillation to give 441.8 g (conversion 44.4%) of a polyisocyanate containing an isocyanurate ring as a distillation residue and 553.2 g (recovery ratio 55.6%) of a distillate.

The resulting polyisocyanate was diluted to a concentration of 75% with "Laws" (a nonpolar petroleum hydrocarbon organic solvent; aniline point 44° C.) to give 589.9 g of a clear polyisocyanate solution (the desired resin composition of this invention).

The polyisocyanate solution had a non-volatile content of 74.9%, a Gardner color number of less than 1, a Gardner viscosity of J-K, an isocyanate content of 11.4% and a molecular weight of 891. The ratio of dilution of the polyisocyanate with "Haws", separately determined, was more than 1,000%.

A resin varnish was prepared by mixing the polyisocyanate solution with "Beckosol J-557" so that the NCO/OH equivalent ratio became 1.0. When the varnish was coated on a glass plate, a good cured film was obtained.

EXAMPLE 12

The same isocyanuration reaction as in Example 8 was carried out except that 3,500 g of 1,3-bis-(isocyanatomethyl)-cyclohexane, 300 g of hydrogenated castor oil and 7.7 g of the same catalyst solution as in Example 8 were used, and the isocyanuration reaction was carried out at 70° C. There was obtained 3,805 g of the reaction mixture containing the deactivated catalyst.

A 1,000 g aliquot of the reaction mixture was subjected to molecular distillation to give 432.8 g (conversion 43.5%) of a polyisocyanate containing an isocyanurate ring as a distillation residue and 562.2 g (recovery ratio 56.5%) of 1,3-bis(isocyanatomethyl)-cyclohexane as a distillate.

The resulting polyisocyanate was diluted to a concentration of 75% with "Haws" (nonpolar solvent) to give 577.1 g of a clear polyisocyanate solution (the desired resin composition of the invention).

The polyisocyanate solution had a non-volatile content of 75.0%, a Gardner viscosity of O-P, an isocyanate content of 11.2% and a molecular weight of 812. The ratio of its dilution to "Haws" was more than 1,000%.

A resin varnish was prepared by mixing the polyisocyanate solution with "Beckosol J-557" so that the NCO/OH equivalent ratio became 1.0. When the varnish was coated on a glass plate, a good cured film was obtained.

EXAMPLE 13

A 75% "Haws" solution of a polyisocyanate containing an isocyanurate ring (conversion 42.8%) was prepared by operating in the same way as in Example 12 except that a 1,6-hexanediol monoester (hydroxyl value 139) of 12-hydroxystearic acid was used instead of the hydrogenated castor oil.

The polyisocyanate solution had a non-volatile content of 75.2%, a Gardner color number of less than 1, a Gardner viscosity of J-K, an isocyanate content of 12.2% and a molecular weight of 790. The ratio of its dilution with "Haws" was more than 1,000%.

A resin varnish was prepared by mixing the polyisocyanate solution with "Beckosol J-557" so that the NCO/OH equivalent ratio became 1.0. When the varnish was coated on a glass plate, a good cured film was obtained.

What is claimed is:

1. A resin composition comprising
   (A) a polyisocyanate having an isocyanurate ring obtained by reacting at least one diisocyanate compound selected from alkylene diisocyanates, cycloalkylene diisocyanates and aralkylene diisocyanates with a diol having 10 to 40 carbon atoms or with a polyester polyol containing 12-hydroxystearic acid as an essential component in the presence of an isocyanuration catalyst, and
   (B) a nonpolar petroleum hydrocarbon organic solvent having an aniline point of 10° to 70° C.

2. The resin composition of claim 1 wherein the alkylene diisocyanates are used and are alkylene diisocyanates containing an alkylene group with 2 to 8 carbon atoms.

3. The resin composition of claim 1 wherein the cycloalkylene diisocyanates are used and are cycloalkylene diisocyanates containing a cycloalkylene group with 6 to 8 carbon atoms.

4. The resin composition of claim 1 wherein the aralkylene diisocyanates are used and are aralkylene diisocyanates containing an aralkylene group with 7 or 8 carbon atoms.

5. The resin composition of claim 1 or 2 wherein the alkylene diisocyanate is hexamethylene diisocyanate.

6. The resin composition of claim 1 or 3 wherein the cycloalkylene diisocyanate is 1,3-bis(isocyanatomethyl)-cyclohexane.

7. The resin composition of claim 1 or 3 wherein the cycloalkylene diisocyanate is 1,4-bis(isocyanatomethyl)-cyclohexane.

8. The resin composition of claim 1 wherein the polyester polyol is used and is a polyester polyol derived from 12-hydroxystearic acid and a difunctional or trifunctional hydrocarbon polyol having 2 to 40 carbon atoms.

9. The resin composition of claim 1 wherein the polyester polyol is used and is hydrogenated castor oil.

10. The resin composition of claim 1 wherein the diol is used and has from 12 to 30 carbon atoms.

11. The resin composition of claim 1 wherein the diol is 1,10-decanediol, 1,12-dodecanediol, 2-hydroxypalmityl alcohol, 12-hydroxystearyl alcohol, hydrogenated product of a dimer of oleyl alcohol or 2,2-bis(4-hydroxycyclohexyl)propane.

12. The resin composition of claim 10 wherein the amount of the diol is from 1 to 40%, based on the amount of the diisocyanate.

13. The resin composition of claim 10 wherein the amount of the diol is from 2 to 30%, based on the amount of the diisocyanate.

14. The resin composition of claims 8 or 9 wherein the amount of the polyester polyol is from 1 to 40%, based on the amount of the diisocyanate.

15. The resin composition of claim 1 wherein the nonpolar organic solvent is a petroleum hydrocarbon organic solvent having an aniline point of from 12° to 65° C.

16. The resin composition of claim 15 wherein the petroleum hydrocarbon organic solvent is an aliphatic, naphthenic or mixed aliphatic and naphthenic hydrocarbon organic solvent.

17. The resin composition of claim 1 wherein the nonpolar organic solvent is methylcyclohexane or ethylcyclohexane.

18. The resin composition of claim 1 wherein the mixing ratio of the polyisocyanate (A) to the nonpolar organic solvent (B) is from 10–90:90–10.

19. The resin composition of claim 1 further comprising a polyol having at least two hydroxyl groups per molecule which is soluble in nonpolar organic solvent and is an alkyd polyol or an acrylic polyol.

* * * * *